United States Patent
Lee et al.

(10) Patent No.: US 8,558,809 B2
(45) Date of Patent: Oct. 15, 2013

(54) APPARATUS AND METHOD FOR OPERATION ACCORDING TO MOVEMENT IN PORTABLE TERMINAL

(75) Inventors: Jae-Myeon Lee, Yongin-si (KR);
Hee-Jun Song, Yongin-si (KR);
Soon-Youl Kwon, Suwon-si (KR);
Byeng-Sang Jung, Suwon-si (KR);
Sun-Young Park, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 275 days.

(21) Appl. No.: 13/179,244

(22) Filed: Jul. 8, 2011

(65) Prior Publication Data
US 2012/0007820 A1   Jan. 12, 2012

(30) Foreign Application Priority Data

Jul. 8, 2010  (KR) ........................ 10-2010-0065709

(51) Int. Cl.
*G06F 3/041* (2006.01)
(52) U.S. Cl.
USPC .......................................... 345/173; 345/156
(58) Field of Classification Search
USPC ........ 345/156, 173, 174, 214, 215; 178/18.01
See application file for complete search history.

(56) References Cited

U.S. PATENT DOCUMENTS

| | | | |
|---|---|---|---|
| 6,549,792 B1 | 4/2003 | Cannon et al. | |
| 7,301,529 B2* | 11/2007 | Marvit et al. | 345/156 |
| 7,593,000 B1* | 9/2009 | Chin | 345/156 |
| 7,603,143 B2* | 10/2009 | Kang et al. | 455/566 |
| 2001/0040551 A1* | 11/2001 | Yates et al. | 345/156 |
| 2007/0259685 A1* | 11/2007 | Engblom et al. | 455/550.1 |
| 2009/0187676 A1* | 7/2009 | Griffin et al. | 710/14 |
| 2009/0207148 A1* | 8/2009 | Sugimoto et al. | 345/173 |
| 2009/0256809 A1* | 10/2009 | Minor | 345/173 |
| 2010/0090564 A1* | 4/2010 | Oh et al. | 310/328 |
| 2010/0099394 A1* | 4/2010 | Hainzl | 455/418 |
| 2010/0134312 A1* | 6/2010 | Park et al. | 340/689 |
| 2010/0194705 A1* | 8/2010 | Kim et al. | 345/173 |
| 2011/0012840 A1* | 1/2011 | Hotelling et al. | 345/173 |
| 2011/0151934 A1* | 6/2011 | Geng | 455/565 |
| 2012/0028683 A1* | 2/2012 | Lee et al. | 455/557 |
| 2012/0133484 A1* | 5/2012 | Griffin | 340/5.54 |

FOREIGN PATENT DOCUMENTS

| | | | |
|---|---|---|---|
| KR | 20060121063 A | * | 11/2006 |
| KR | 100856239 B1 | | 9/2008 |

* cited by examiner

*Primary Examiner* — Joe H Cheng

(57) ABSTRACT

An apparatus and method operate a portable terminal according to touch and movement. When a touch is sensed, an angle of the portable terminal is determined. When the determined angle belongs to a grip zone, the portable terminal is transitioned to a wake up state.

20 Claims, 3 Drawing Sheets

APPARATUS AND METHOD FOR OPERATION ACCORDING TO MOVEMENT IN PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 8, 2010 and assigned Serial No. 10-2010-0065709, the entire disclosure of which is hereby incorporated by reference.

TECHNICAL FIELD OF THE INVENTION

The present invention relates to an apparatus and method for sensing when a user raises a portable terminal using an acceleration sensor and a touch sensor, and making the portable terminal transition to a wake-up state and a hot key menu access activation state.

BACKGROUND OF THE INVENTION

When a portable terminal is in a sleep mode or lock mode state, in order to wake up the portable terminal, the conventional art has performed the following operations.

First, in a flip type portable terminal, it wakes up when the portable terminal is flipped open or a predefined button of the portable terminal is pressed.

In a slide type portable terminal, it wakes up a cover is slid out or a predefined button of the portable terminal is pressed.

In a bar type portable terminal, it wakes up a hold key is pressed for a predetermined time.

Among these, unlike the flip type or slide type portable terminal, the bar type portable terminal could not intuitively forward its own current state to a user unless the user pressed a hold key.

However, this method has a problem of causing an inconvenience in that a user should directly press and hold a hold key, and also has a problem of not being capable of obtaining a prompt feedback from the portable terminal because the user just cannot use a hot key of the portable terminal.

Furthermore, there is a problem in that this method is in contraposition to reducing the number of buttons.

SUMMARY OF THE INVENTION

To address the above-discussed deficiencies of the prior art, it is a primary object to provide at least the advantages below. Accordingly, one aspect of the present invention is to provide an apparatus and method for operation according to a motion in a portable terminal.

Another aspect of the present invention is to provide an apparatus and method for recognizing an operation of user raising a portable terminal, and waking up the portable terminal.

The above aspects are achieved by providing an apparatus and method for operation according to a motion in a portable terminal.

According to one aspect of the present invention, a method for operating a portable terminal is provided. The method includes determining whether a touch is sensed. When a touch is sensed, an angle of the portable terminal is determined. Whether the determined angle belongs to a grip zone is determined. And the portable terminal is transitioned to a wake up state when the determined angle belongs to the grip zone.

According to another aspect of the present invention, an apparatus of a portable terminal is provided. The apparatus includes a touch sensor, an acceleration sensor, and a controller. The touch sensor senses a touch. The acceleration sensor outputs an acceleration value according to a motion of the portable terminal. The controller determines whether a touch is sensed, determines an angle of the portable terminal when the touch is sensed, determines whether the determined angle belongs to a grip zone, and wakes up the portable terminal when the determined angle belongs to the grip zone.

According to yet another aspect of the present invention, a non-transitory computer-readable storage device comprising a computer program code configured to cause a controller in a portable terminal to perform a process according to touch and movement is provided. The process includes determining whether a touch is sensed, determining an angle of the portable terminal when the touch is sensed, determine whether the determined angle belongs to a grip zone, and waking up the portable terminal when the determined angle belongs to the grip zone.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; the term "memory" includes any non-transitory computer-readable device; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
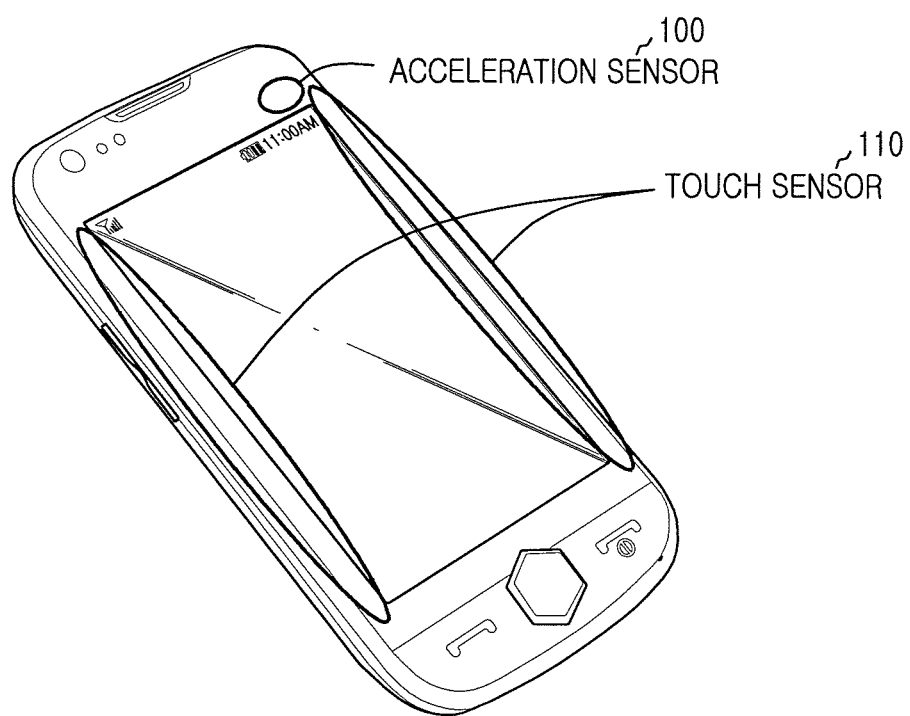
FIG. 1 is a schematic diagram of a portable terminal according to an embodiment of the present invention.
Figure 2:
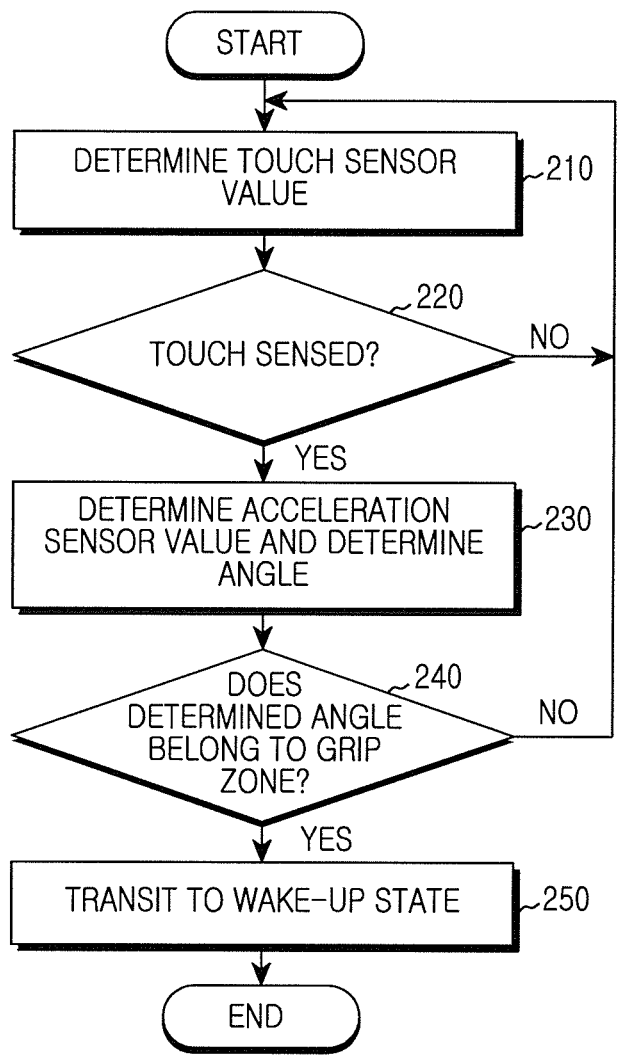
FIG. 2 illustrates a process in a portable terminal for waking up based on detecting movement according to an embodiment of the present invention.
Figure 3:
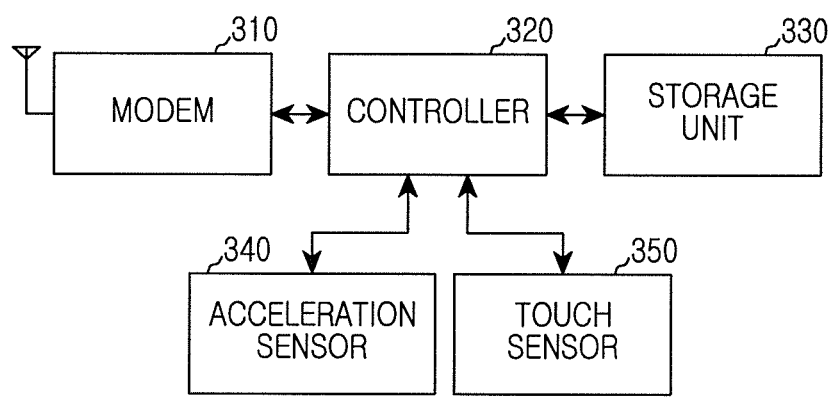
FIG. 3 is a block diagram of a portable terminal according to an embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Below, embodiments of the present invention provide an apparatus and method for operation according to a motion in a portable terminal.

FIG. 1 is a schematic diagram of a portable terminal according to an embodiment of the present invention.

Referring to FIG. 1, an acceleration sensor 100 determines acceleration according to a motion of the portable terminal and returns a determination value. Touch sensors 110 are provided at both sides of the portable terminal and sense a user's touches. In the present disclosure, an operation of a user raising the portable terminal to look at the screen of the portable terminal is referred to as a grip.

FIG. 2 illustrates a process in a portable terminal for waking up based on detecting a movement according to an embodiment of the present invention.

Referring to FIG. 2, a touch sensor of the portable terminal determines a touch sensor value (block 210).

When a touch is detected (block 220), the portable terminal controls an acceleration sensor to determine acceleration and determines a movement angle of the portable terminal according to the determined acceleration value (block 230). The angle determination using the acceleration sensor can use an existing algorithm.

If the determined angle belongs to a grip zone (block 240), the portable terminal determines that a user raises the portable terminal, and transitions to a wake-up state (block 250). In an embodiment, the portable terminal may also consider the acceleration and movement path.

Here, the determined angle belongs to the grip zone when the angle (e.g. orientation angle, movement angle, and such) of the portable terminal belongs to an angle range associated with a user raising the portable terminal (e.g. a range of motion, movement path, and such), and the grip zone represents an angle range of +/− in a state of holding the portable terminal erect (e.g. within a threshold from a set angle or orientation at which the portable terminal is to wake up from a sleep state) and can change according to a user's definition and an experiment value.

When the touch does not occur (block 220) or the determined angle does not belong to the grip zone (block 240), the touch sensor of the portable terminal returns to block 210 and waits for a touch to be detected.

FIG. 3 is a block diagram of a portable terminal according to an embodiment of the present invention.

Referring to FIG. 3, the portable terminal includes a modem 310, a controller 320, a storage unit 330, an acceleration sensor 340, and a touch sensor 350.

The modem 310, a module for communicating with other devices, includes a wireless processor, a baseband processor and so forth. The wireless processor changes a signal received through an antenna into a baseband signal and provides the baseband signal to the baseband processor. And, the wireless processor changes a baseband signal from the baseband processor into a wireless signal such that it can transmit the baseband signal on an actual wireless path and transmits the wireless signal through the antenna.

The storage unit 330 may be a memory that stores a program for controlling a general operation of the portable terminal and temporary data generated during program performance.

When the portable terminal moves, the acceleration sensor 340 determines and outputs an acceleration value for the motion.

The touch sensor 350 indicates when a touch is sensed.

The controller 320 controls a general operation of the portable terminal. For example, the controller 320 processes and controls voice calls and packet communications. In an embodiment, the controller also controls the acceleration sensor 340 and the touch sensor 350 according to the present invention.

When the controller 320 detects that a touch occurs through the touch sensor 350, the controller 320 controls the acceleration sensor 340 to determine acceleration, and determines an angle of the portable terminal using the determined acceleration value. The angle determination using the acceleration sensor can use an existing algorithm.

If the determined angle belongs to the grip zone, the controller 320 determines that a user raises the portable terminal, and transitions to a wake-up state. According to an embodiment, the determined angle belongs to the grip zone when the determined angle of the portable terminal belongs to an angle range associated with a user raising the portable terminal. The grip zone represents an angle range of +/− in a state of holding the portable terminal erect (e.g. within a threshold from a set angle or orientation at which the portable terminal is to wake up from a sleep state) and can change according to a user's definition and an experiment value.

When the touch does not occur or the determined angle does not belong to the grip zone, the controller 320 waits until a touch is detected by the touch sensor 350.

Embodiments of the present invention can be used for allowing a user to wake up a portable terminal or enter a hot key menu without pressing a key of the portable terminal.

Although the present disclosure has been described with embodiments, various changes and modifications may be suggested to one skilled in the art. It is intended that the present disclosure encompass such changes and modifications as fall within the scope of the appended claims.

What is claimed is:

1. A method for operating a portable terminal, the method comprising:
   determining, by a controller, whether a touch is sensed;
   when the touch is sensed, determining, by the controller, an angle of the portable terminal;
   determining, by the controller, whether the determined angle belongs to a grip zone; and
   when the determined angle belongs to the grip zone, waking up, by the controller, the portable terminal.

2. The method of claim 1, further comprising, when the determined angle belongs to the grip zone, activating, by the controller, a hot key menu access of the portable terminal.

3. The method of claim 1, wherein determining the angle of the portable terminal comprises:
   determining a value of an acceleration sensor according to a motion of the portable terminal; and
   determining the angle of the portable terminal using the determination value of the acceleration sensor.

4. The method of claim 1, wherein the grip zone corresponds to an angle range associated with a user raising the portable terminal.

5. The method of claim 1, wherein the portable terminal comprises a bar type form.

6. The method of claim 1, further comprising when the determined angle does not belong to the grip zone, waiting for, by the controller, a next touch to be sensed.

7. An apparatus of a portable terminal comprising:
   a touch sensor configured to sense a touch;
   an acceleration sensor configured to output an acceleration value according to a motion of the portable terminal; and
   a controller configured to determine whether a touch is sensed, determine an angle of the portable terminal when the touch is sensed, determine whether the determined angle belongs to a grip zone, and transition the portable terminal to a wake up state when the determined angle belongs to the grip zone.

8. The apparatus of claim 7, wherein the controller is further configured to activate a hot key menu access of the portable terminal when the determined angle belongs to the grip zone.

9. The apparatus of claim 7, wherein the controller is further configured to determine a value of the acceleration sensor according to the motion of the portable terminal, and
determine the angle of the portable terminal using the acceleration value.

10. The apparatus of claim 7, wherein the grip zone corresponds to an angle range associated with a user raising the portable terminal.

11. The apparatus of claim 7, wherein the portable terminal comprises a bar type form.

12. The apparatus of claim 7, wherein the controller is further configured to wait for a next touch is detected when the determined angle does not belong to the grip zone.

13. The apparatus of claim 7, wherein the touch sensor comprises a sensor on at least one side of the portable terminal.

14. The apparatus of claim 7, further comprising a storage unit configured to store a program for operating the controller.

15. A non-transitory computer-readable storage device comprising a computer program code configured to cause a controller in a portable terminal to perform a process according to touch and movement, the process comprising the steps of:

determining whether a touch is sensed,
when the touch is sensed, determining an angle of the portable terminal,
determining whether the determined angle belongs to a grip zone, and
when the determined angle belongs to the grip zone, waking up the portable terminal.

16. The non-transitory computer-readable storage device of claim 15, wherein the process further comprises activating a hot key menu access of the portable terminal when the determined angle belongs to the grip zone.

17. The non-transitory computer-readable storage device of claim 15, wherein the step of determining the angle of the portable terminal comprises:
determining a value of an acceleration sensor according to a motion of the portable terminal; and
determining the angle of the portable terminal using the determination value of the acceleration sensor.

18. The non-transitory computer-readable storage device of claim 15, wherein the grip zone corresponds to an angle range associated with a user raising the portable terminal.

19. The non-transitory computer-readable storage device of claim 15, wherein the process further comprises the step of waiting for a next touch to be sensed when the determined angle does not belong to the grip zone.

20. The non-transitory computer-readable storage device of claim 15, wherein the portable terminal includes a touch sensor and an acceleration sensor.

* * * * *